US009898721B2

(12) United States Patent
Li et al.

(10) Patent No.: US 9,898,721 B2
(45) Date of Patent: Feb. 20, 2018

(54) DISPLAY SYSTEM WITH SECURITY FEATURES

(71) Applicant: BOE TECHNOLOGY GROUP CO., LTD., Beijing (CN)

(72) Inventors: Wenbo Li, Beijing (CN); Zhongbao Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 276 days.

(21) Appl. No.: 14/415,111

(22) PCT Filed: Jun. 12, 2014

(86) PCT No.: PCT/CN2014/079761
§ 371 (c)(1),
(2) Date: Jan. 15, 2015

(87) PCT Pub. No.: WO2015/081680
PCT Pub. Date: Jun. 11, 2015

(65) Prior Publication Data
US 2016/0034868 A1 Feb. 4, 2016

(30) Foreign Application Priority Data
Dec. 4, 2013 (CN) .......................... 2013 1 0646343

(51) Int. Cl.
G06Q 20/10 (2012.01)
G02F 1/1335 (2006.01)
(Continued)

(52) U.S. Cl.
CPC ......... G06Q 20/1085 (2013.01); G02F 1/139 (2013.01); G02F 1/133514 (2013.01);
(Continued)

(58) Field of Classification Search
CPC .................................................. G06Q 20/1085
See application file for complete search history.

(56) References Cited

U.S. PATENT DOCUMENTS 7,434,060 B2 * 10/2008 Dunn .................... H04M 3/382
345/4
2002/0038818 A1 * 4/2002 Zingher ............. G06K 9/00597
235/381
(Continued)

FOREIGN PATENT DOCUMENTS

CN         2615697 Y      5/2004
CN       201926835 U      8/2011
(Continued)

OTHER PUBLICATIONS

Office Action in Chinese Patent Application No. 201310646343.0, dated May 17, 2016.
(Continued)

Primary Examiner — Elda G Milef
Assistant Examiner — Gregory S Cunningham, II
(74) Attorney, Agent, or Firm — Brooks Kushman P.C.

(57) ABSTRACT

The present disclosure provides a display system which includes an electronic device and a user-side auxiliary viewing module. The electronic device may include a device-side display module, which includes an array substrate, a color filter substrate, a liquid crystal layer arranged between the array substrate and the color filter substrate, and a first polarizer adhered onto a surface of the array substrate away from the liquid crystal layer. A second polarizer may be arranged on the user-side auxiliary viewing module, and have a polarization axis in a direction substantially perpendicular to a polarization axis of the first polarizer.

11 Claims, 4 Drawing Sheets

(51) Int. Cl.
  *G06K 9/00* (2006.01)
  *G02F 1/139* (2006.01)
  *G07F 19/00* (2006.01)
(52) U.S. Cl.
  CPC ... *G02F 1/133528* (2013.01); *G06K 9/00006* (2013.01); *G07F 19/201* (2013.01); *G02F 2001/133531* (2013.01)

(56) References Cited

U.S. PATENT DOCUMENTS

| | | | | |
|---|---|---|---|---|
| 2003/0016317 | A1* | 1/2003 | Kotchick | H04M 1/0283 349/96 |
| 2010/0063888 | A1* | 3/2010 | Sajkowsky | G06Q 20/204 705/17 |
| 2010/0110323 | A1 | 5/2010 | Shao et al. | |
| 2011/0060456 | A1* | 3/2011 | Lowe | G06Q 10/06 700/237 |
| 2011/0096486 | A1* | 4/2011 | Oh | F16M 11/10 361/679.21 |
| 2012/0080517 | A1* | 4/2012 | Braunstein | G07F 9/026 235/379 |
| 2012/0138677 | A1* | 6/2012 | Ma | G07F 19/207 235/379 |
| 2013/0184856 | A1* | 7/2013 | Gregerson | G07F 11/005 700/232 |

FOREIGN PATENT DOCUMENTS

| | | |
|---|---|---|
| CN | 202120350 U | 1/2012 |
| CN | 102625131 A | 8/2012 |
| CN | 102645797 A | 8/2012 |
| CN | 202584306 U | 12/2012 |
| CN | 202677021 U | 1/2013 |
| CN | 103020451 A | 4/2013 |
| CN | 202995194 U | 6/2013 |
| CN | 202995879 U | 6/2013 |
| CN | 103456051 A | 12/2013 |
| CN | 103676295 A | 3/2014 |

OTHER PUBLICATIONS

Office Action in Chinese Patent Application No. 201310646343.0, dated Sep. 25, 2015.

International Search Report and Written Opinion in PCT International Application No. PCT/CN2014/079761, dated Sep. 26, 2014.

Office Action in Chinese Patent Application No. 201310646343.0, dated Dec. 2, 2016.

* cited by examiner

-PRIOR ART-

DISPLAY SYSTEM WITH SECURITY FEATURES

CROSS-REFERENCE TO RELATED APPLICATION

This application is the U.S. national phase of PCT Application No. PCT/CN2014/079761 filed on Jun. 12, 2014, which claims priority to Chinese Patent Application No. 201310646343.0 filed on Dec. 4, 2013, the disclosures of which are incorporated in their entirety by reference herein.

FIELD OF THE INVENTION

The present disclosure relates to the field of security technology, in particular to a display system with security features.

DESCRIPTION OF THE PRIOR ART

As is well known, a liquid crystal display (LCD) device has become a common pursuit due to its environment-friendly features such as being light and thin, low power consumption and multiple functions.

A normal display region can merely be limited to a narrow front view region by means of a narrow viewing angle of liquid crystals, while display information cannot be viewed or viewed clearly at the regions at both left and right sides. As a result, it is able to protect privacy somewhat.

However, during the implementation of the present disclosure, the inventors find that there are the following defects in the prior art.

The liquid crystal display device functions as to present the information to a user, and no matter how narrow the viewing angle is, the user can always read the information in particular directions. Hence, one who intentionally peeks at the information displayed currently by the display device can always read or shoot the information from a particular angle, which will result in information leakage.

For example, for an Automatic Teller Machine (ATM), a mobile phone or a laptop Personal Computer (PC), a peeper can always see the information viewed currently by the legitimate user from directly behind the user.

SUMMARY OF THE INVENTION

Technical Solutions to be Solved

An object of the present disclosure is to provide a display system including a liquid crystal display device, so as to improve the display security.

Technical Solutions

In order to achieve the above object, the present disclosure provides a display system, including an electronic device and a user-side auxiliary viewing module. The electronic device includes a device-side display module, which includes:
an array substrate;
a color filter substrate;
a liquid crystal layer arranged between the array substrate and the color filter substrate; and
a first polarizer adhered onto a surface of the array substrate away from the liquid crystal layer,
wherein the user-side auxiliary viewing module is provided with a second polarizer, and the second polarizer has a polarization axis in a direction substantially perpendicular to a polarization axis of the first polarizer.

In the electronic device, the user-side auxiliary viewing module may be a spectacle whose lenses are adhered with the second polarizer at their surfaces, or the second polarizer itself.

The electronic device may be a mobile phone, a laptop Personal Computer (PC), or an Automatic Teller Machine (ATM).

The electronic device may further include:
a chamber configured to accommodate the user-side auxiliary viewing module;
a verification module configured to verify validity of a current user, so as to acquire a verification result; and
a device providing module configured to take out the user-side auxiliary viewing module from the chamber and provide it to the user when the verification result indicates that the current user is valid, and otherwise refuse to provide the user-side auxiliary viewing module to the user.

The electronic device may further include a card reader, and the verification module is specifically configured to verify the validity of the user according to information in a debit card read by the card reader.

The electronic device may further include a card reader and a fingerprint reader, and the verification module may be specifically configured to acquire the verification result indicating that the current user is valid when there is a correspondence between the information in the debit card read by the card reader and fingerprint information read by the fingerprint reader.

The electronic device may further include:
a prompt module configured to prompt the user to replace the user-side auxiliary viewing module when the user selects to terminate serving;
a replacement detection module configured to detect whether or not the user has replaced the user-side auxiliary viewing module, so as to acquire a replacement detection result; and
a replacement control module configured to refuse to terminate the serving when the replacement detection results indicates that the user does not replace the user-side auxiliary viewing module.

A readable device identifier may be provided at the user-side auxiliary viewing module, and the electronic device may further include:
a reading unit configured to read the device identifier at the user-side auxiliary viewing module;
a first reading control module configured to control the reading unit to read the device identifier at the user-side auxiliary viewing module when the device providing module provides the user-side auxiliary viewing module; and
a second reading control module configured to control the reading unit to perform a reading operation after the prompt module prompts the user to replace the user-side auxiliary viewing module.

The replacement detection module acquires the replacement detection result indicating that the user does not replace the user-side auxiliary viewing module, when the device identifier read by the reading unit under the control of the second reading control module is different from the device identifier read by the reading unit under the control of the first reading control module, or the device identifier cannot be read by the reading unit under the control of the second reading control module.

In the electronic device, the device identifier may be a Radio Frequency Identification (RFID) tag or a scanning identification code.

The electronic device may further include:

a sensing detection module configured to detect whether or not a user is present within a predetermined range of the electronic device, so as to acquire a user detection result; and an operational state control module configured to control the device-side display module to be in an operational state when the user detection result indicates that the user is present within the predetermined range of the electronic device, and otherwise control the device-side display module to be in a suspend state.

The electronic device may further include:

a camera module;

an alarming button; and a user operation detection module configured to control the camera module to perform a recording operation when it is detected that the alarming button is pressed.

The electronic device may further include:

the fingerprint reader; and a storage control module configured to store video data recorded by the camera module and the fingerprint information read by the fingerprint reader when the alarming button is pressed.

Advantageous Effects

The present disclosure has the following advantageous effects. According to the display system of the present disclosure, two polarizers of the liquid crystal display device necessary for completing the display functions are arranged separately. For example, a lower polarizer is arranged at the device side while an upper polarizer is arranged at the user-side auxiliary viewing module, and the two polarizers constitute a display system. Because it is impossible to acquire the auxiliary viewing module, a peeper cannot acquire the contents displayed by the electronic device, and as a result, the information security will be ensured.

BRIEF DESCRIPTION OF THE DRAWINGS

In order to illustrate the technical solutions of the present disclosure or the prior art in a clearer manner, the drawings desired for the embodiments will be described hereinafter briefly. Obviously, the following drawings merely relate to some embodiments of the present disclosure, and based on these drawings, a person skilled in the art may obtain other drawings without any creative effort.

DETAILED DESCRIPTION OF THE PREFERRED EMBODIMENTS

The present disclosure will be described hereinafter in conjunction with the drawings and embodiments. The following embodiments are for illustrative purpose only, but shall not be used to limit the scope of the present disclosure.

In order to make the objects, the technical solutions and the advantages of the present disclosure more apparent, the present disclosure will be described hereinafter in a clear and complete manner in conjunction with the drawings. Obviously, the following embodiments are merely a part of rather than all of, the embodiments of the present disclosure. Based on these embodiments, a person skilled in the art may obtain the other embodiments, which also fall within the scope of the present disclosure.

Unless otherwise defined, any technical or scientific terms used herein shall have the common meaning understood by a person having ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

According to an electronic device of the present disclosure, two polarizers of a liquid crystal display device necessary for completing the display functions are arranged separately. For example, a lower polarizer is arranged at a device side while an upper polarizer is arranged at a user-side auxiliary viewing module, and the two polarizers constitute a display system. Because it is impossible to acquire the auxiliary viewing module, a peeper cannot acquire the contents displayed by the electronic device, and as a result, the information security will be ensured.

Figure 1:
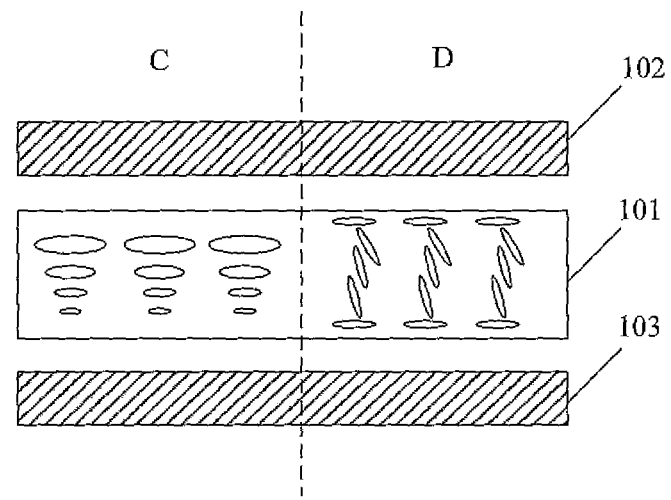
FIG. 1 is a schematic view showing an existing liquid crystal display device.

Generally speaking, as shown in FIG. 1, a liquid crystal display device capable of displaying information normally at least includes:

a panel structure 101 which at least includes an array substrate, a color filter substrate and a liquid crystal layer arranged between the array substrate and the color filter substrate;

an upper polarizer 102; and a lower polarizer 103.

In FIG. 1, regions C and D correspond to a dark state and a bright state, respectively. It is found that only when the upper polarizer 102 is present would a part of, or all of, the rays transmitted through each pixel unit be filtered so as to form an image.

In the electronic device of the present disclosure, the upper polarizer 102 and the lower polarizer 103 are arranged at different sides, respectively. For example, one is arranged at a device while the other is arranged at a user end. When a user-side auxiliary viewing mobile is not used, light rays transmitted through a device-side display module will not be filtered by the upper polarizer 102, so valid display information cannot be viewed directly.

Figure 2:
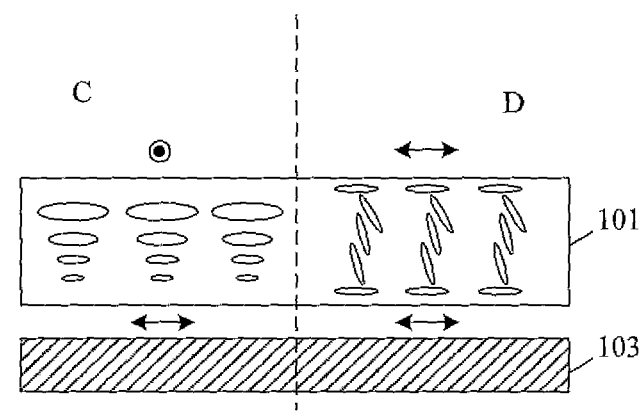
FIG. 2 is a schematic view showing a device-side display module of an electronic device according to one embodiment of the present disclosure.

In the present disclosure, the device-side display module and the user-side auxiliary viewing module constitute a display system. As shown in FIG. 2, the device-side display module includes:

the panel structure 101 which at least includes the array substrate, the color filter substrate and the liquid crystal layer arranged between the array substrate and the color filter substrate; and a first polarizer 103 (i.e., the lower polarizer) adhered onto a surface of the array substrate away from the liquid crystal layer.

Meanwhile, the user-side auxiliary viewing module is provided with a second polarizer, and the second polarizer has a polarization axis in a direction substantially perpendicular to a polarization axis of the first polarizer.

According to the present disclosure, when a user views the device-side display module with the user-side auxiliary viewing module, a part of light rays transmitted through the device-side display module will be filtered by the polarizer at the user-side auxiliary viewing module, and the remaining light rays will be transmitted through the user-side auxiliary viewing module and received by the user's eyes. As a result, the user can view the valid display information.

Based on the above, the display system of the present disclosure may be used to prevent a peeper from peeking at or shooting the information displayed on the electronic device, thereby to improve the information security.

In a preferred embodiment, the user-side auxiliary viewing module may merely be one polarizer. Of course, in order to facilitate the use, it may also be a spectacle whose lenses are adhered with the second polarizer. And at this time, the user may directly use the user-side auxiliary viewing module like a common spectacle.

In a preferred embodiment, the electronic device may be various electronic devices having private application scenarios, such as a mobile phone, a laptop Personal Computer (PC) and an Automatic Teller Machine (ATM).

The present disclosure will be described hereinafter by taking the ATM as an example.

Based on the above, only when the electronic device of the present disclosure needs to be used together with the user-side auxiliary viewing module provided with the polarizer (e.g., the spectacle adhered with the polarizer) would the user view the valid information displayed on the electronic device. When the electronic device is an ATM, obviously it will be inappropriate if each user is required to carry such a spectacle, and this will also result in tremendous waste of resources. Because there are few users who will carry this kind of spectacle, and at this time, the ATM can merely provide serving for a part of the users.

In order to improve the utilization rate of the device, in a preferred embodiment, a chamber may be provided within the electronic device, so as to accommodate the user-side auxiliary viewing module.

Meanwhile, after the verification, the user-side auxiliary viewing module may be taken out from the chamber and provided to the user by a device providing module. Otherwise, the provision of the user-side auxiliary viewing module to the user will be refused.

The electronic device with the above functions further includes:

the chamber for accommodating the user-side auxiliary viewing module;

a verification module configured to verify validity of a current user, so as to acquire a verification result; and the device providing module configured to take out the user-side auxiliary viewing module from the chamber and provide it to the user when the verification result indicates that the current user is valid, and otherwise refuse to provide the user-side auxiliary viewing module to the user.

In this way, each ATM is provided with at least one spectacle adhered with the polarizers. After the verification, the spectacle may be provided to the user, so the user is unnecessary to carry the spectacle adhered with the polarizers by himself/herself, and the device can provide serving for all of, other than a part of the users. As a result, it is able to improve the utilization rate of the device.

In addition, the spectacle adhered with the polarizers will be provided in accordance with the verification information, and the serving will be provided to the dedicated users, so as to protect the device. Otherwise, the device damage will be accelerated if any person can use the device arbitrarily.

There are various methods for verifying whether or not the current user is valid, and two of them will be described hereinafter.

<Verification by Debit Card>

Generally, a card reader is provided within the ATM so as to read information (including user information and account information) stored in the debit card. The verification may verify the validity of the user in accordance with the information in the debit card read by the card reader and information stored at a back end.

If a user picks up a cancelled debit card and inserts it into an ATM, the verification of the information stored in the disused card read by the card reader will fail.

<Verification by Debit Card in Conjunction with user's Physiological Characteristics>

When a user picks up a debit card which has not yet been canceled, the verification will also succeed if the aforementioned method is used.

In order to prevent this situation, in a preferred embodiment, the verification is performed in accordance with the debit card in conjunction with the user's physiological characteristics.

In this way, by taking fingerprint as an example, the electronic device further includes a card reader and a fingerprint reader. And the verification module is specifically configured to acquire the verification result indicating that the current user is invalid when there is no correspondence between the information in the debit card read by the card reader and fingerprint information read by the fingerprint reader.

Here, in the following cases, there will not exist the correspondence: (1) the information in the debit card read by the card reader has not be recorded; (2) the fingerprint information read by the fingerprint reader has not be recorded; and (3) the information in the debit card read by the card reader and the fingerprint information read by the fingerprint reader have been recorded but do not correspond to each other. The case (3) indicates that the debit card does not belong to the user himself In this way, it is able to significantly improve the security of the ATM. When a user loses his own debit card, another user who picks up the debit card cannot use the card through the ATM.

As mentioned above, the user-side auxiliary viewing module is placed within the ATM and provided to the user when the serving is required to be provided, so it is able to facilitate the user's operation.

However, if no action is taken, some users may not replace the spectacle after the use thereof In this situation, a next user cannot acquire the user-side auxiliary viewing module anymore and thus cannot use the ATM. Meanwhile, a financial loss will occur to the bank.

In order to prevent the above-mentioned situation, in a preferred embodiment, the electronic device further includes:

a prompt module configured to prompt the user to replace the user-side auxiliary viewing module when the user selects to terminate the serving;

a replacement detection module configured to detect whether or not the user has replaced the user-side auxiliary viewing module, so as to acquire a replacement detection result; and a replacement control module configured to refuse to terminate the serving (e.g., a transaction) when the replacement detection result indicates that the user does not replace the user-side auxiliary viewing module.

For example, when the user selects to terminate the serving after the use of the ATM, usually the debit card will be withdrawn from the ATM. In the present disclosure, the ATM will prompt the user to replace the user-side auxiliary viewing module and meanwhile detect whether or not the user has replaced it. If the user has replaced the user-side auxiliary viewing module, it will be placed within the chamber again. The ATM will control a card withdrawing module to release the debit card, and then terminate the serving. If the user has not replaced the user-side auxiliary viewing module, the ATM will refuse to terminate the serving, and the user cannot withdraw the debit card from the ATM. At this time, the user has no choice but to replace the user-side auxiliary viewing module.

Through the above-mentioned methods, it is able to ensure the normal serving of the ATM and prevent the financial loss of the bank.

In a preferred embodiment, a readable device identifier may be provided at the user-side auxiliary viewing module so as to decide whether or not the user has replaced the user-side auxiliary viewing module.

The electronic device further includes:

a reading unit configured to read the device identifier at the user-side auxiliary viewing module;

a first reading control module configured to control the reading unit to read the device identifier at the user-side auxiliary viewing module when the device providing module provides the user-side auxiliary viewing module; and a second reading control module configured to control the reading unit to perform a reading operation after the prompt module prompts the user to replace the user-side auxiliary viewing module.

The replacement detection module is specifically configured to acquire the replacement detection result indicating that the user does not replace the user-side auxiliary viewing module, when the device identifier read by the reading unit under the control of the second reading control module is different from the device identifier read by the reading unit under the control of the first reading control module, or the device identifier cannot be read by the reading unit under the control of the second reading control module.

In this way, when the user-side auxiliary viewing module is provided to the user, the device identifier at the user-side auxiliary viewing module will be read by the reading unit and then stored. When the user selects to terminate the serving, the user will be prompted to replace the user-side auxiliary viewing module and then the device identifier will be read by the reading unit periodically. Once a device identifier has been read, it will be transmitted to the detection module. The detection module will compare the device identifier currently read by the reading unit with the device identifier read when the user-side auxiliary viewing module is provided. If the device identifiers are not consistent with each other, or the device identifier cannot be read by the reading unit under the control of the second reading control module, the replacement detection result indicating that the user does not replace the user-side auxiliary viewing module will be obtained, and the ATM will refuse to terminate the serving.

The device identifier may be implemented in various ways. For example, a RFID tag or a scanning identification code may be used. This is known in the prior art and will not be particularly described herein.

For the ATM, the power consumption of the display module accounts for a large portion of the power consumption of the entire device. In order to reduce the power consumption, in a preferred embodiment, the electronic device further includes:

a sensing detection module configured to detect whether or not a user is present within a predetermined rage of the electronic device, so as to acquire a user detection result; and an operational state control module configured to control the device-side display module to be in an operational state when the user detection result indicates that a user is present within the predetermined range of the electronic device, and otherwise control the device-side display module to be in a suspend state.

For the ATM with the sensing detection module and the operational state control module, the user will be detected only when he/she moves into the predetermined range (e.g., at a distance of 0.3 m or 0.4 m away from the ATM, where the predetermined range may be set in accordance with the environment, e.g., the distance needs to be smaller for the ATM inside the bank due to the crowded environment, while the distance may be larger for the ATM located within an independent space), and at this time, the device-side display module will be in the operational state. Otherwise, it will be in the suspend state. As a result, it is able to reduce the power consumption of the ATM.

For the ATM, it is required to prevent the information from being stolen and prevent the ATM from robbery by a malicious user. In order to protect the user, the electronic device in this embodiment further includes:

a camera module;

an alarming button; and a user operation detection module configured to control the camera module to perform a recording operation when it is detected that the alarming button is pressed.

During the use of the ATM with the above-mentioned modules, the user may press the alarming button when he/she finds there is another malicious user behind him. Once the alarming button is pressed, a video recording function of the camera module will be triggered automatically so as to record the scene. If there is indeed a robbery, a criminal suspect will be determined as soon as possible in accordance with the video recorded by the camera module, so as to recover the user's loss. Meanwhile, the camera module will also act as a deterrent to offenders.

Of course, when the alarming button is pressed, the phone number 110 may be dialed automatically so as to call the police. However, if this way is abused, it will result in the waste of police manpower. Hence, in a preferred embodiment, the electronic device further includes:

a fingerprint reader; and a storage control module configured to store video data recorded by the camera module and the fingerprint information read by the fingerprint reader when the alarming button is pressed.

Preferably, the fingerprint reader is arranged on the alarming button.

The ATM in this embodiment will be described hereinafter in conjunction with a specific example.

Figure 3:
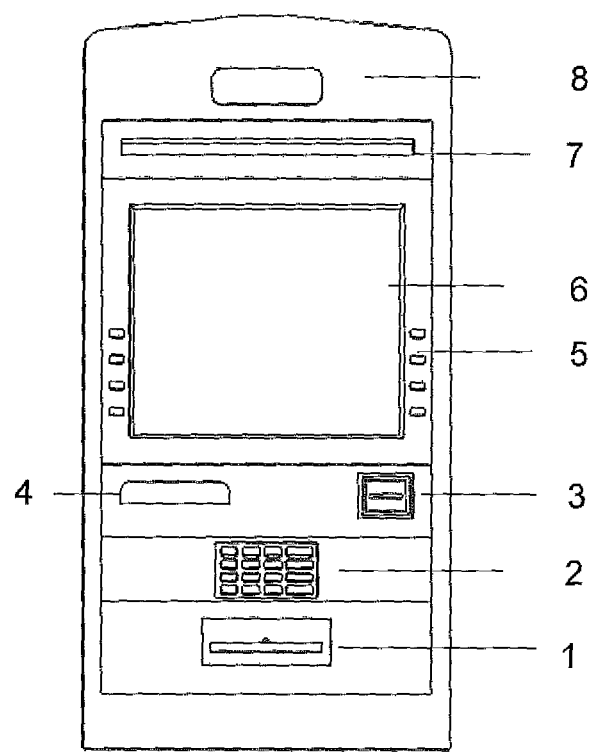
FIG. 3 is a schematic view showing an ATM according to one embodiment of the present disclosure.

As shown in FIG. 3, the ATM includes a cash access port 1, a digital keyboard 2, a card port 3, a spectacle picking-and-placing port 4, an operational button 5, a screen 6 that does not include the upper polarizer, a lamp 7 and a sensor 8 configured to detect whether or not a user is present within the predetermined range.

It should be appreciated that, FIG. 3 merely shows an illustrative structure, and the ATM may include more or less modules. If a full touch screen (e.g., a resistance-type, capacitance-type, infrared, sonic-based or ceramic voltage-controlled touch screen), the digital keyboard 2 and the operational button 5 may be cancelled.

For another example, one or more of the alarming module, a camera and a fingerprint identification module may be added to the structure shown in FIG. 3.

Figure 4:
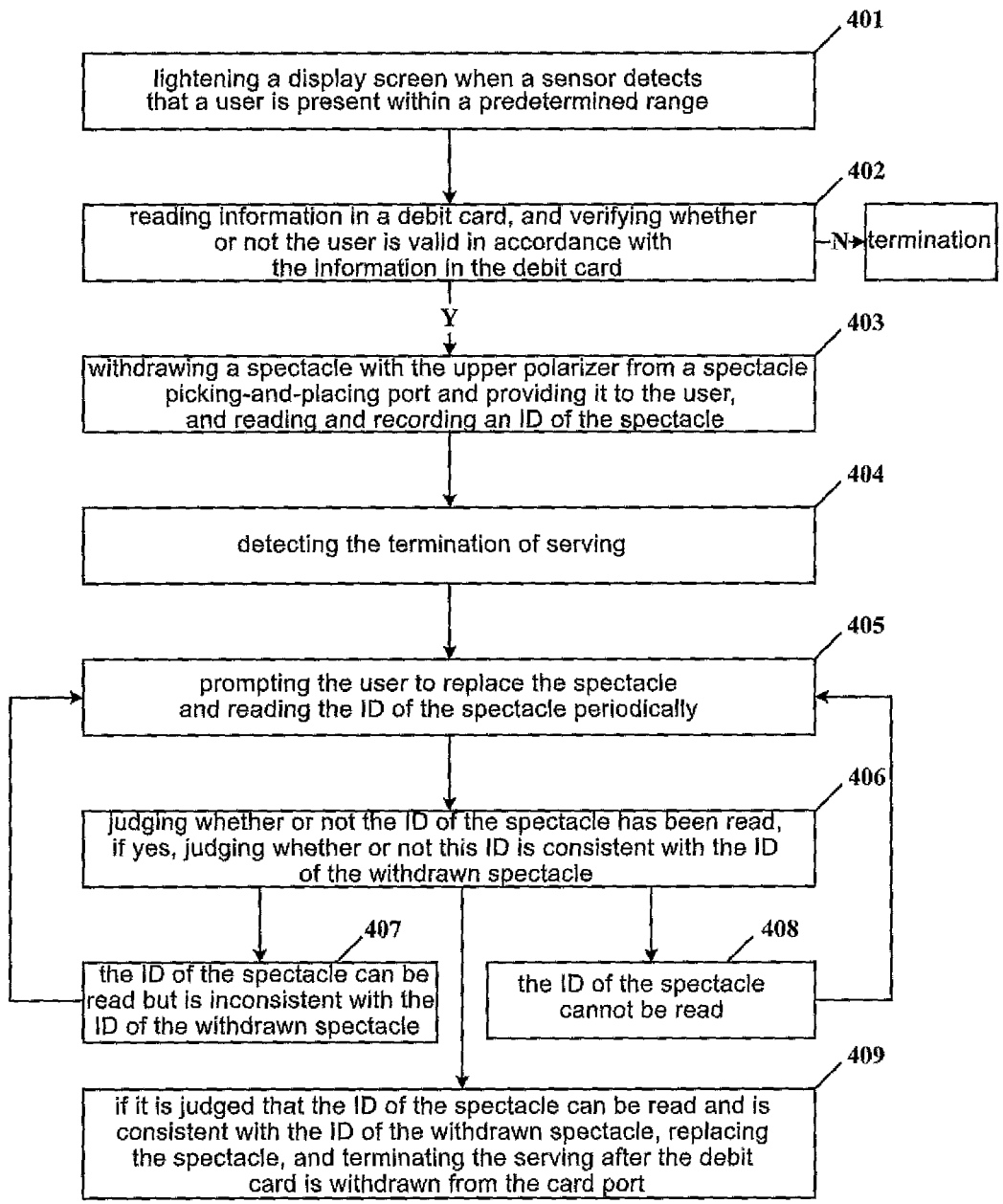
FIG. 4 is a schematic view showing an operation procedure of the ATM according to one embodiment of the present disclosure.

The operational procedure of the ATM shown in FIG. 3 will be described hereinafter. As shown in FIG. 4, it includes the following steps.

Step 401: lightening the display screen when the sensor detects that a user is present within the predetermined range.

Step 402: reading information in the debit card after the user inserts the debit card into the ATM through the card port, verifying whether or not the user is valid in accordance with the information in the debit card read by the card reader. If the user is a valid one, proceeding to Step 403, and otherwise terminating the procedure. In this step (i.e., Step 402), in order to strengthen the verification, prevent the occurrence of impersonation and facilitate the subsequent query, a step of reading a fingerprint may also be added, and the verification may be performed based on the fingerprint and the information in the debit card. In this case, the user will be considered as a valid one only when a fingerprint ID is consistent with a debit card ID.

Step 403: withdrawing the spectacle with the upper polarizer from the spectacle picking-and-placing port and providing it to the user, and reading and recording an ID of the spectacle.

Step 404: detecting the termination of serving after the user wears the spectacle to operate the ATM for a period of time.

Step 405: prompting the user to replace the spectacle and reading the ID of the spectacle periodically.

Step 406: deciding whether or not the ID of the spectacle has been read, if yes, deciding whether or not this ID is consistent with the ID of the spectacle withdrawn from the spectacle picking-and-placing port.

Step 407: if it is judged that the ID of the spectacle cannot be read, returning to Step 405.

Step 408: if it is judged that the ID of the spectacle can be read but is inconsistent with the ID of the spectacle withdrawn from the spectacle picking-and-placing port, returning to Step 405.

Step 409: if it is judged that the ID of the spectacle can be read and is consistent with the ID of the spectacle withdrawn from the spectacle picking-and-placing port, replacing the spectacle, and terminating the serving after the debit card is withdrawn from the card port.

Of course, in the above procedure, if the user does not replace the spectacle, Steps 405 and 407 may be repeated endlessly. In a preferred embodiment, a timer may be set after the user is prompted to replace the spectacle, and after the timer is expired, the debit card will be drawn back if the ID of the spectacle cannot be read, and then the serving will be terminated.

In a preferred embodiment, the ATM may include a plurality of modules, e.g., a spectacle identification module, a distance sensing module, a fingerprint identification module, a display control module, a system control module, a CPU and a storage module. These modules may be connected to, and communicate with, each other by a bus.

Figure 5:
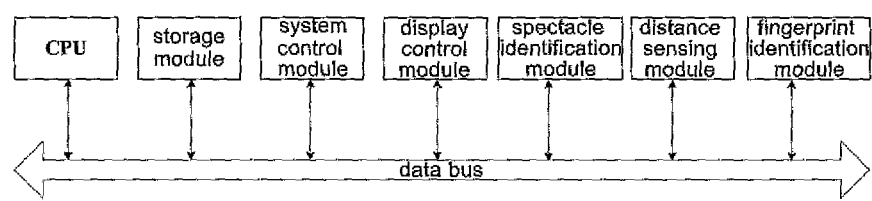
FIG. 5 is a schematic view showing a connection relationship among modules of the ATM according to one embodiment of the present disclosure.

FIG. 5 shows the connection relationship among these modules. It should be appreciated that, the above modules and the connection relationship thereamong are for illustrative purposes only, and the ATM of the present disclosure is not limited to the above modules (e.g., it may further include the camera module and the alarming module) and the above connection mode.

As shown in FIG. 5, the modules are connected to a data bus. The CPU, the system control module and the storage module form a microprocessor control module, which communicates with a screen control module via the data bus so as to achieve the display function.

A conventional screen control module at least includes a gate line driving control module and a data line driving control module. It may further include one or more of a sequence control module, a backlight control module and a touch control module. The spectacle identification module may be configure to identify the spectacle by means of a scanning identification code printed at, or a RFID chip built in, a special site, e.g., a leg, a bracket or a frame, of the peep-proof spectacle.

The above embodiments are for illustratively purposes only, but shall not be used to limit the present disclosure. It should be appreciated that, a person skilled in the art may make further modifications or alterations without depart from the spirit of the present disclosure, and these modifications or alterations shall also fall within the scope of the present disclosure.

What is claimed is:

1. A display system, comprising an electronic device and a user-side auxiliary viewing module, wherein the electronic device comprises a device-side display module, and the device-side display module comprises:
   an array substrate;
   a color filter substrate;
   a liquid crystal layer arranged between the array substrate and the color filter substrate; and
   a first polarizer adhered onto a surface of the array substrate away from the liquid crystal layer,
   wherein the user-side auxiliary viewing module is provided with a second polarizer, and the second polarizer has a polarization axis in a direction substantially perpendicular to a polarization axis of the first polarizer;
   the electronic device is an Automatic Teller Machine (ATM); and
   the electronic device further comprises:
   a card reader;
   a chamber configured to accommodate the user-side auxiliary viewing module that prevents a peeper from acquiring contents displayed by the ATM for each user;
   a processor configured to verify validity of a current user according to information in a card read by the card reader, so as to acquire a verification result; and
   a picking-and-placing port configured to allow the user to take out the user-side auxiliary viewing module from the chamber through the picking-and-placing port when the verification result indicates that the current user is valid, and otherwise prevent the user-side auxiliary viewing module from being taken out of the chamber through the picking-and-placing port.

2. The display system according to claim 1, wherein the user-side auxiliary viewing module is a spectacle whose lenses are adhered with the second polarizers at their surfaces.

3. The display system according to claim 1, wherein the user-side auxiliary viewing module is a second polarizer itself.

4. The display system according to claim 1, wherein the card is a debit card.

5. The display system according to claim 1, wherein the electronic device further comprises a fingerprint reader, and the processor is specifically configured to acquire the verification result indicating that the current user is invalid when there is no a correspondence between the information in the card read by the card reader and fingerprint information read by the fingerprint reader.

6. The display system according to claim 1, wherein the electronic device further comprises:
   an ATM display configured to prompt the user visually to replace the user-side auxiliary viewing module when the user selects to terminate serving; and
   the processor is further configured to refuse to terminate a transaction when the user does not replace the user-side auxiliary viewing module in the chamber.

7. The display system according to claim 1, wherein the electronic device further comprises:
   an ATM display configured to prompt the user visually to replace the user-side auxiliary viewing module when the user selects to terminate serving;
   a reader configured to read a device identifier at the user-side auxiliary viewing module, wherein the reader is a Radio Frequency Identification (RFID) reader or a scanner;
   the processor is further configured to control the reader to read the device identifier at the user-side auxiliary viewing module when the picking-and-placing port allows the user to take out the user-side auxiliary viewing module from the chamber through the picking-and-placing port;
   the processor is further configured to control the reader to perform a reading operation after the ATM display prompts the user to replace the user-side auxiliary viewing module; and
   the processor is further configured to refuse to terminate a transaction when the device identifier read by the reader after the ATM display prompts the user to replace the user-side auxiliary viewing module is different from the device identifier read by the reader when the picking-and-placing port allows the user to take out the user-side auxiliary viewing module from the chamber through the picking-and-placing port, or the device identifier cannot be read by the reader after the ATM display prompts the user to replace the user-side auxiliary viewing module.

8. The display system according to claim 7, wherein the device identifier is a RFID tag or a scanning identification code.

9. The display system according to claim 1, wherein the electronic device further comprises:
   a sensor configured to detect whether or not a user is present within a predetermined range of the electronic device, so as to acquire a user detection result; and
   the processor is further configured to control the device-side display module to be in an operational state when the user detection result indicates that the user is present within the predetermined range of the electronic device, and otherwise control the device-side display module to be in a suspend state.

10. The display system according to claim 1, wherein the electronic device further comprises:
    a video camera;
    an alarming button; and
    the processor is further configured to control the video camera to perform a recording operation when it is detected that the alarming button is pressed.

11. The display system according to claim 10, wherein the electronic device further comprises:
    a fingerprint reader; and
    a storage memory configured to store video data recorded by the video camera and fingerprint information read by the fingerprint reader when the alarming button is pressed.

* * * * *